US011018569B1

(12) United States Patent
Herrin et al.

(10) Patent No.: US 11,018,569 B1
(45) Date of Patent: May 25, 2021

(54) TORQUE AUGMENTATION DEVICE

(71) Applicants: Robert Herrin, Orlando, FL (US); Sean R. Khant, Tampa, FL (US)

(72) Inventors: Robert Herrin, Orlando, FL (US); Sean R. Khant, Tampa, FL (US)

( * ) Notice: Subject to any disclaimer, the term of this patent is extended or adjusted under 35 U.S.C. 154(b) by 0 days.

(21) Appl. No.: 16/847,739

(22) Filed: Apr. 14, 2020

(51) Int. Cl.
*H02K 49/10* (2006.01)
*H02K 41/06* (2006.01)

(52) U.S. Cl.
CPC ........... *H02K 49/102* (2013.01); *H02K 41/06* (2013.01)

(58) Field of Classification Search
CPC .............................. H02K 49/102; H02K 41/06
USPC ......................................................... 310/103
See application file for complete search history.

(56) References Cited

U.S. PATENT DOCUMENTS

| 1,495,784 | A | | 5/1924 | Fereday | |
|---|---|---|---|---|---|
| 3,299,819 | A | | 1/1967 | McMoy | |
| 3,796,898 | A | * | 3/1974 | Kleinwaechter | ........ F16H 13/00 310/103 |
| 4,115,040 | A | * | 9/1978 | Knorr | .................. H02K 49/106 310/104 |
| 4,196,365 | A | * | 4/1980 | Presley | .................. H02K 49/10 310/103 |
| 4,767,378 | A | | 8/1988 | Obermann | |
| 6,054,788 | A | | 4/2000 | Dombrovski et al. | |
| 6,411,001 | B1 | | 6/2002 | Henderson et al. | |
| 6,841,910 | B2 | * | 1/2005 | Gery | .................... H02K 49/106 310/103 |
| 7,024,963 | B2 | | 4/2006 | French | |
| 7,105,968 | B2 | * | 9/2006 | Nissen | ................. H02K 49/102 310/103 |
| 7,268,454 | B2 | * | 9/2007 | Wise | ...................... H02K 7/025 310/103 |
| 8,690,687 | B1 | | 4/2014 | Tsai et al. | |
| 9,863,480 | B2 | | 1/2018 | Puchhammer | |
| 10,224,798 | B2 | | 3/2019 | Leas | |
| 10,541,597 | B2 | * | 1/2020 | Whitfield | ............. H02K 49/102 |
| 2004/0066107 | A1 | * | 4/2004 | Gery | .................... H02K 49/106 310/103 |
| 2006/0111191 | A1 | | 5/2006 | Wise | |
| 2006/0119201 | A1 | * | 6/2006 | Nissen | ................. H02K 49/102 310/103 |

(Continued)

FOREIGN PATENT DOCUMENTS

DE 38410112 7/1990
EP 0962044 6/2003

*Primary Examiner* — John K Kim
(74) *Attorney, Agent, or Firm* — Larson & Larson, P.A.; Justin P. Miller; Frank Liebenow (57) ABSTRACT

The torque augmentation device has two primary embodiments. The first embodiment is two rotors, the rotors including rings of permanent magnets. The two rotors are angled with respect to each other. The magnetic field is disrupted on the bottom half by a ferrous flux diversion plate. With the forces unbalanced between the upper and lower halves of the rotors, rotation will result, thus augmenting the torque production of any associated rotational device. The second embodiment uses a straight shaft, with a single central rotor, both sides of the rotor covered in magnets. In place of adjacent rotors, the second half of the magnets is placed on fixed plates, one on each side of the central rotor. The fixed plates are set at an angle with respect to the central rotor, creating the unbalanced forces that cause rotation.

4 Claims, 9 Drawing Sheets

(56) References Cited

U.S. PATENT DOCUMENTS

2007/0007835 A1\* 1/2007 Wise .................... H02K 49/108
 310/80
2008/0090694 A1 4/2008 Wise et al.

\* cited by examiner

TORQUE AUGMENTATION DEVICE

FIELD

This invention relates to the field of mechanical devices producing rotational energy and more particularly to a device that creates additional torque in a rotating system.

BACKGROUND

Rotational mechanical energy is the workhorse of our world. From pumping liquids, to moving trains, rotational motion is critical.

While horsepower is the metric most often cited when discussing the capability of a machine, it is torque that allows machines to accomplish their work. Without the torque to rotate, no work could be accomplished.

What is needed is a system for increasing the torque of a rotational system, thus increasing its capacity for work.

SUMMARY

The torque augmentation device has two primary embodiments.

The first embodiment is two rotors, the rotors including rings of permanent magnets. The two rotors are angled with respect to each other. The angle is less than ninety degrees, or perpendicular, and greater than zero degrees, or parallel.

The magnets are oriented to attract the two rotors toward each other because this is a more efficient use of the magnetic force as compared to the repelling orientation.

As the magnets attract each other, the attractive force is split into two vectors: a vector that is perpendicular to an imaginary plane that divides the two canted rotors, and a vector that is parallel to the face of the rotors. This parallel vector causes rotation, as the magnets at the top of the rotors move to be closer to one other. This parallel vector is a function of the sine of the canted rotor angle. The torque generated by this vector is impacted by the radius of the rotors.

The torque created by the rotation of the upper half of the rotors would be counteracted by the opposite effect created by the magnets on the lower half—the magnets on the lower half of the rotors also want to rotate toward the end with the smaller gap, thus an opposing torque is created.

Consequently, the rotors would be static, with the opposing torques resulting in no motion. The solution is to disrupt the attraction of the magnets on either the upper or lower half of the rotor, or a segment of the upper or lower half, thus unbalancing the rotors and causing rotation.

In the first embodiment, the magnetic field is disrupted on the bottom half by a ferrous flux diversion plate—for example, a steel plate, diverting the attractive magnetic force between the bottom halves of the rotors. A non-ferrous material, such as aluminum, will not divert the magnetic field. Therefore, a non-ferrous material cannot be used as a diversion plate.

With the forces unbalanced between the upper and lower halves of the rotors, rotation results, thus augmenting the torque production of any associated rotational device.

The first embodiment is intended for use to augment torque of an existing system. Thus, the driver, such as an electric motor, and the load, such as a pump, do not need to pass through the device. Rather, the device is connected to the same shaft as the driver and/or load, supplementing existing torque. It is not the goal of the device to act as a transmission, but rather as an independent source of torque. But the load may be passed through the device if mechanically desirable.

While the first embodiment is mechanically straightforward, a straight shaft is preferred, rather than two shafts at angles with respect to each other.

Thus, the second embodiment uses a straight shaft, with a single central rotor, both sides of the rotor covered in magnets.

In place of adjacent rotors, the second half of the magnets is placed on fixed plates, one on each side of the central rotor. The fixed plates are set at an angle with respect to the central rotor, creating the unbalanced forces that cause rotation.

In place of the ferrous plate in the first embodiment, the second embodiment splits the magnets on the fixed plates, or static plates, into an upper half and a lower half. In the preferred embodiment, the upper half of magnets on the fixed plates are set to attract the magnets on the upper half of the rotor.

The lower half of the magnets of the fixed plates are either omitted, thus avoiding creation of any attraction between the rotor and the fixed plates, or set at opposing polarity, thus creating a repelling effect that increases the torque by pushing the rotor away.

While the preferred embodiment is as described, alternative embodiments are anticipated.

For example, permanent magnets are preferred, but electromagnets are a possible substitution.

Discrete permanent magnets are shown, but arc-shaped magnets can be substituted to create a smoother action, rather than the "cogging" or stepped rotation effect that discrete magnets can cause.

As shown in the drawings, the magnets are preferably placed in a Halbach arrangement, thus focusing the magnetic flux away from the rotor and plate faces.

For example, stacked atop each other, a typical Halbach arrangement of magnets is:
N-S magnet horizontal
N-S magnet vertical
S-N magnet horizontal Magnetic flux is a measurement of the magnetic field that passes through a given area. The measurement and illustration of magnetic flux is used to understand and measure the magnetic field present across a given area. Flux lines are a visualization of the magnetic field.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
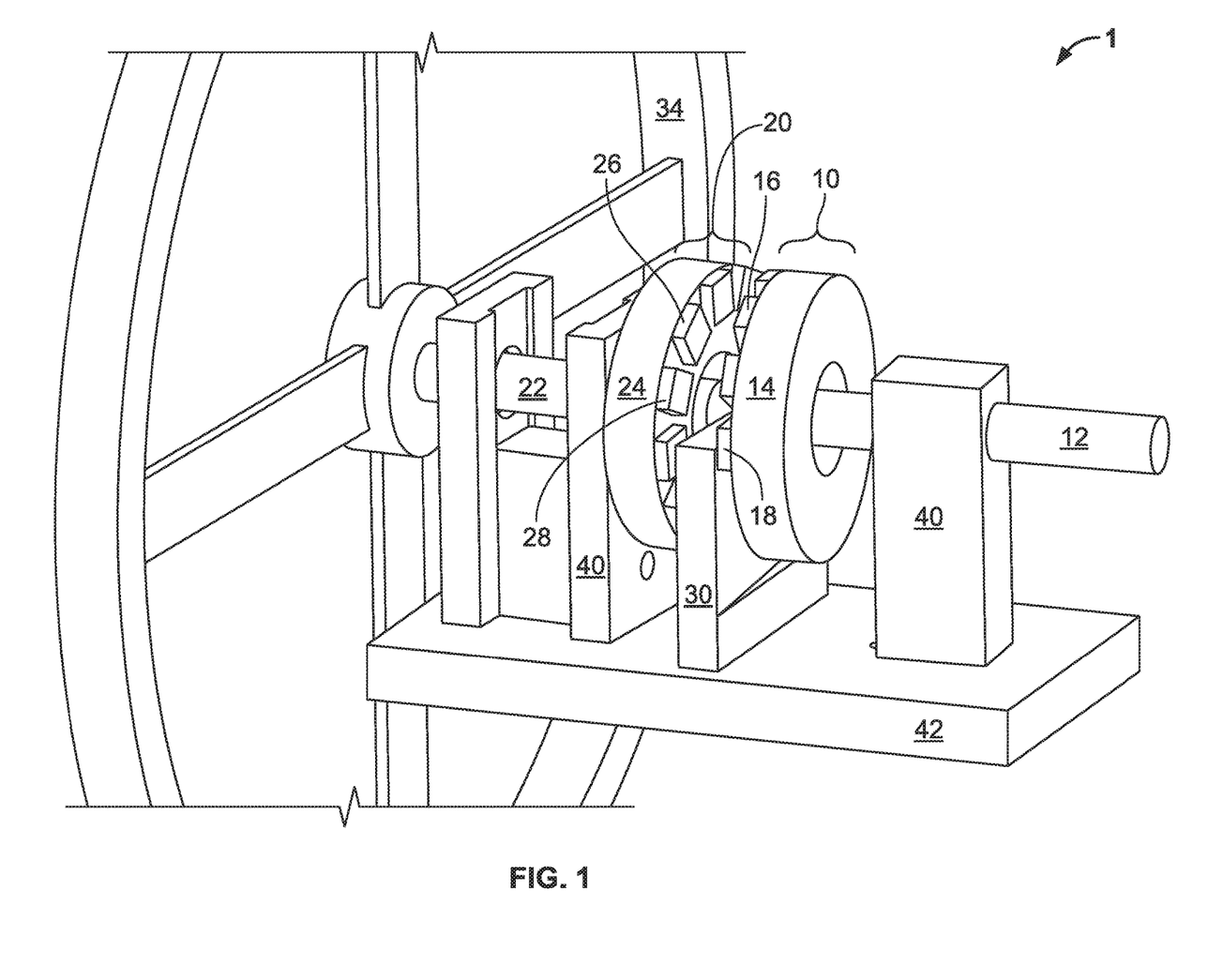
FIG. 1 illustrates a first isometric view of the first embodiment of the torque augmentation device.

Referring to FIG. 1, a first isometric view of the first embodiment of the torque augmentation device is shown.

The torque augmentation device 1 is primarily formed from a first rotatable assembly 10 and second rotatable assembly 20.

The first rotatable assembly 10 includes a first shaft 12, first rotor 14, and a first magnet set 16 formed from many individual magnet sets 18.

The second rotatable assembly 20 includes a second shaft 22, second rotor 24, and second magnet set 26 formed from many individual magnet sets 28.

Separating the lower half of the first rotor 14 and second rotor 24 is a tapered flux diversion plate 30, blocking the lower half of the first magnet set 16 from magnetically interacting with the lower half of the second magnet set 26.

A flywheel 34 is shown at the end of the second shaft 22, the flywheel 34 acting to smooth the rotational motion.

The first shaft 12 and second shaft 22 are each supported by a bearing block 40, the bearing blocks 40 affixed to a mounting plate 42.

Figure 2:
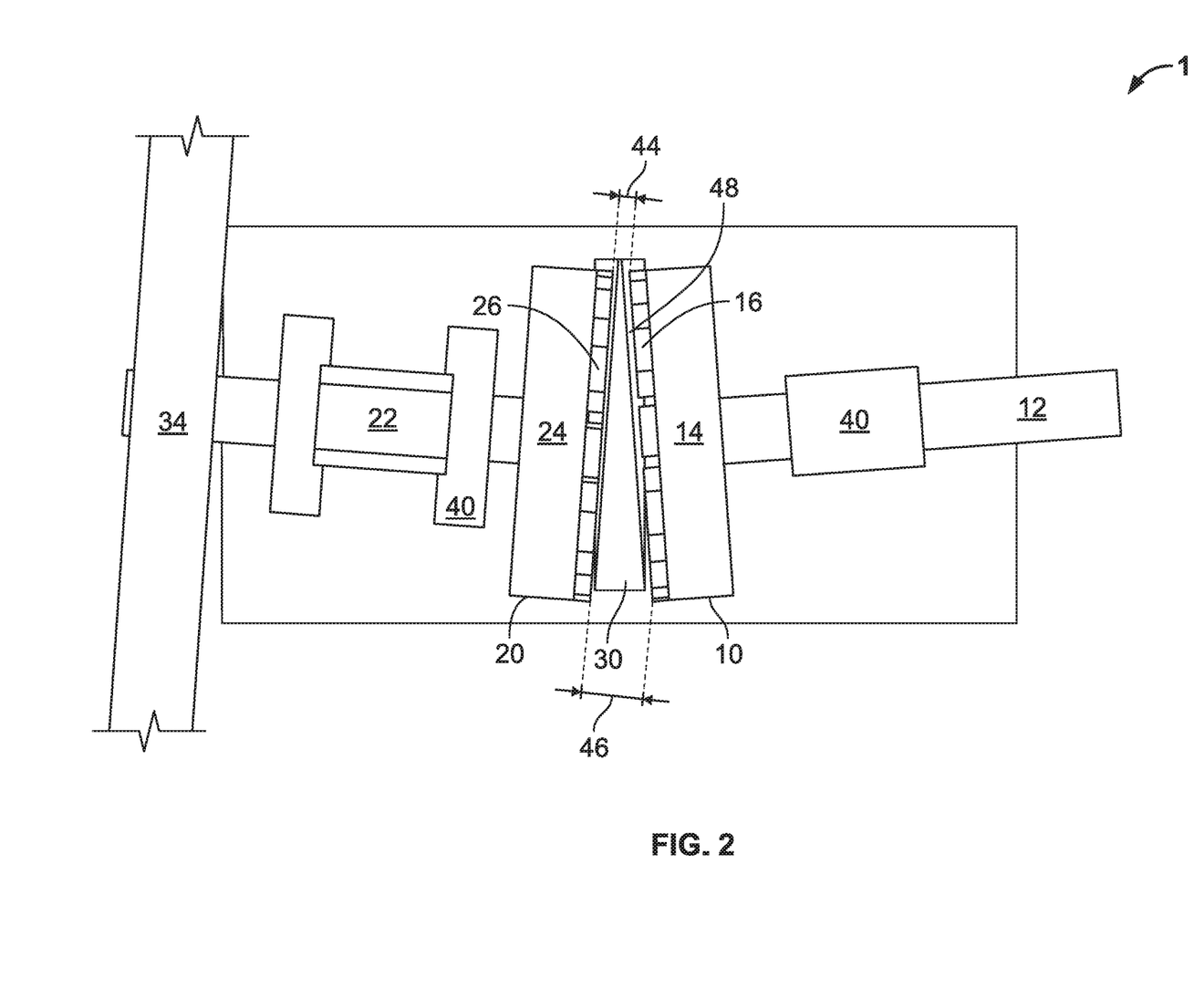
FIG. 2 illustrates a second isometric view of the first embodiment of the torque augmentation device.

Referring to FIG. 2, a second isometric view of the first embodiment of the torque augmentation device is shown.

The tapered flux diversion plate 30 is visible between the first magnet set 16 and second magnet set 26. The shape of the tapered flux diversion plate 30 maintains consistent distance between itself and the magnet sets 16/26 to fully divert any magnetic field emanating from the lower half of the magnet sets 16/26.

The minimum rotor magnetic gap 44 is seen at the end of the first rotatable assembly 10 and second rotatable assembly 20 that are closest, and the maximum rotor magnetic gap 46 is visible at the end where the assemblies 10/20 are at their most separated.

Figure 3:
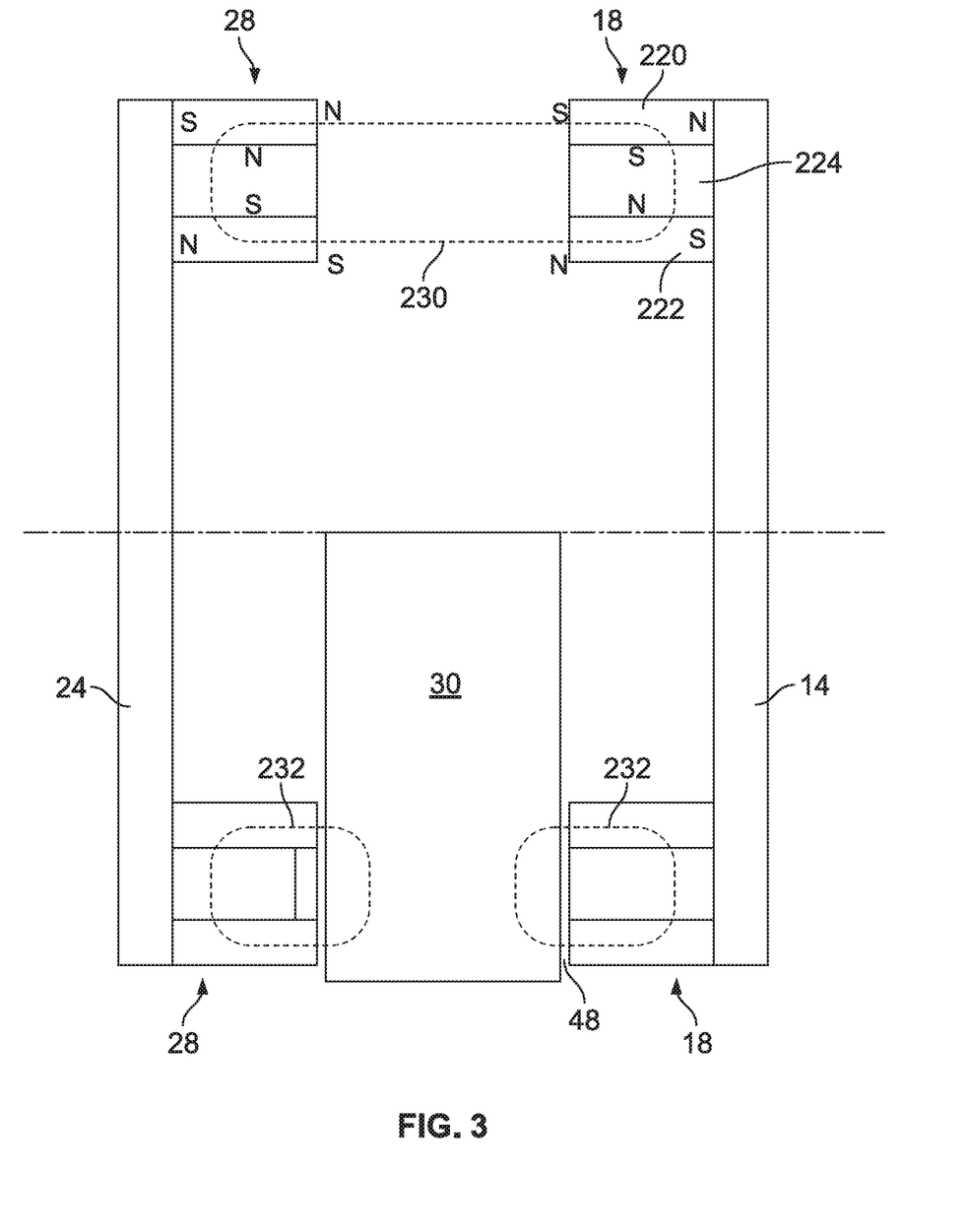
FIG. 3 illustrates a vertical cross-sectional schematic view of the first embodiment of the torque augmentation device.

Referring to FIG. 3, a vertical cross-sectional schematic view of the first embodiment of the torque augmentation device is shown.

The first rotor 14 is shown with an individual magnet set 18 formed from an outer magnet 220; inner magnet 222; and center magnet 224.

The outer magnet 220 is orientated S in, N out, the inner magnet 222 the opposite, and the center magnet 224 with S up and N down. This Halbach arrangement focuses the magnetic field toward the second rotor 24, which has a similar, but reversed magnet set 28.

The continuous flux line 230 connects the two magnet sets 18/28, the magnet sets 18/28 attracting each other.

In contrast, the magnet sets 18/28 that are separated by the tapered flux diversion plate 30 cannot interact. The tapered flux diversion plate 30 bends the flux lines, creating diverted flux lines 232, thus avoiding interaction of the magnet sets 18/28 and creating an unbalanced force.

One may also note the magnet and plate gap 48, or the space between the tapered flux diversion plate 30 and associated magnet sets 18/28.

Figure 4:
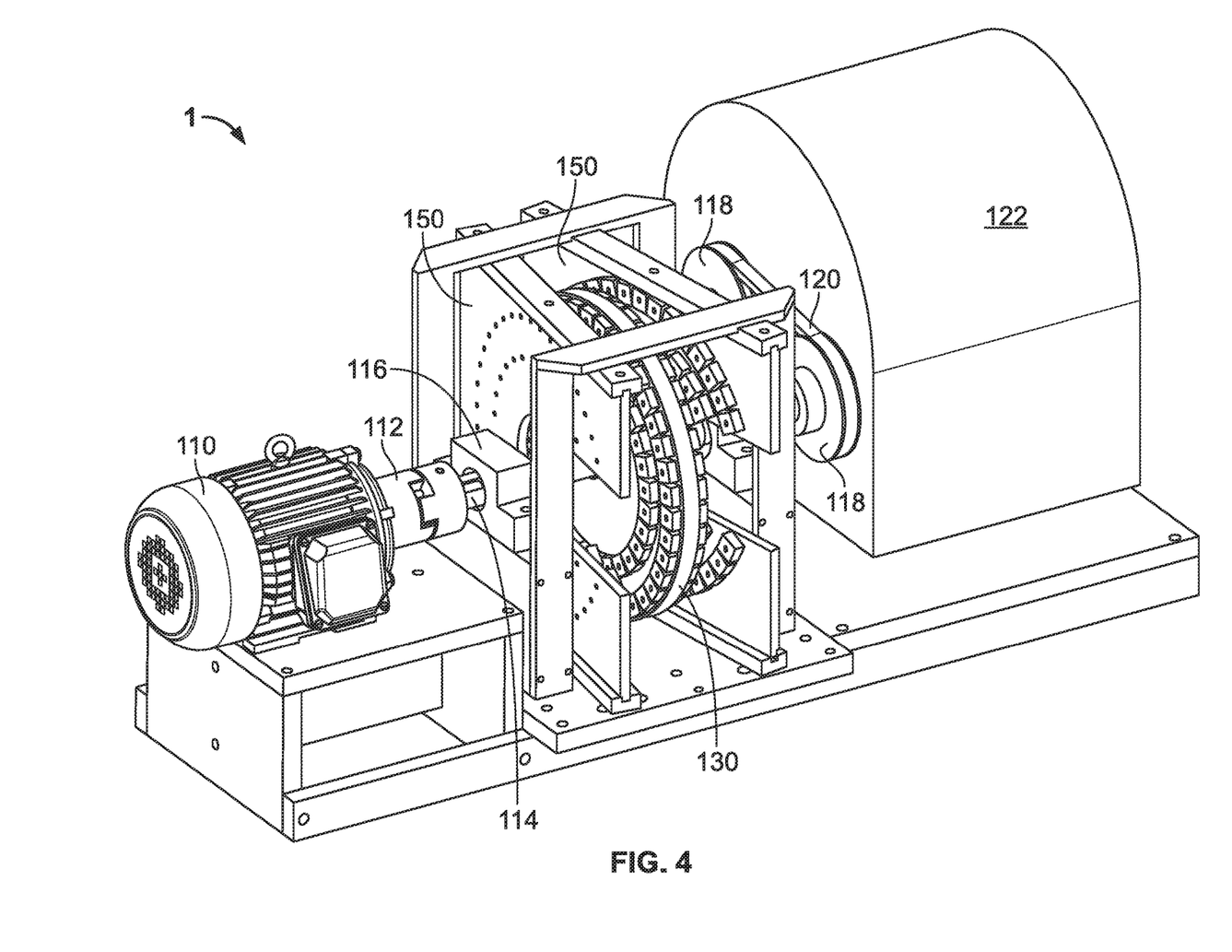
FIG. 4 illustrates an isometric view of the second embodiment of the torque augmentation device.

Referring to FIG. 4, an isometric view of the second embodiment of the torque augmentation device is shown.

In the second embodiment, the two rotors are combined into a single rotor with outward-facing magnets, with fixed magnets on either side.

The torque augmentation device 1 is shown installed as part of a system for running a load.

The driver 110, shown as an electric motor, is connected via coupling 112 to a shaft 114, the shaft 114 connected to a pulley 118, connected via a belt 120 to a second pulley 118, in turn running a load 122.

The driver 110 is any source of rotational energy. For example, an electric motor, gasoline engine, wind turbine, and so forth.

The load 122 is a pump, compressor, or any other load for which the input is rotational energy.

The shaft 114 is shown supported by bearing blocks 116.

The rotating assembly 130 of the torque augmentation device 1 is placed between two static assemblies 150. By angling the static assemblies 150, the unbalanced magnetic force is created, while maintaining a straight shaft 114. Thus, the benefits of the first embodiment are maintained while creating the mechanical simplicity of a straight shaft.

Figure 5:
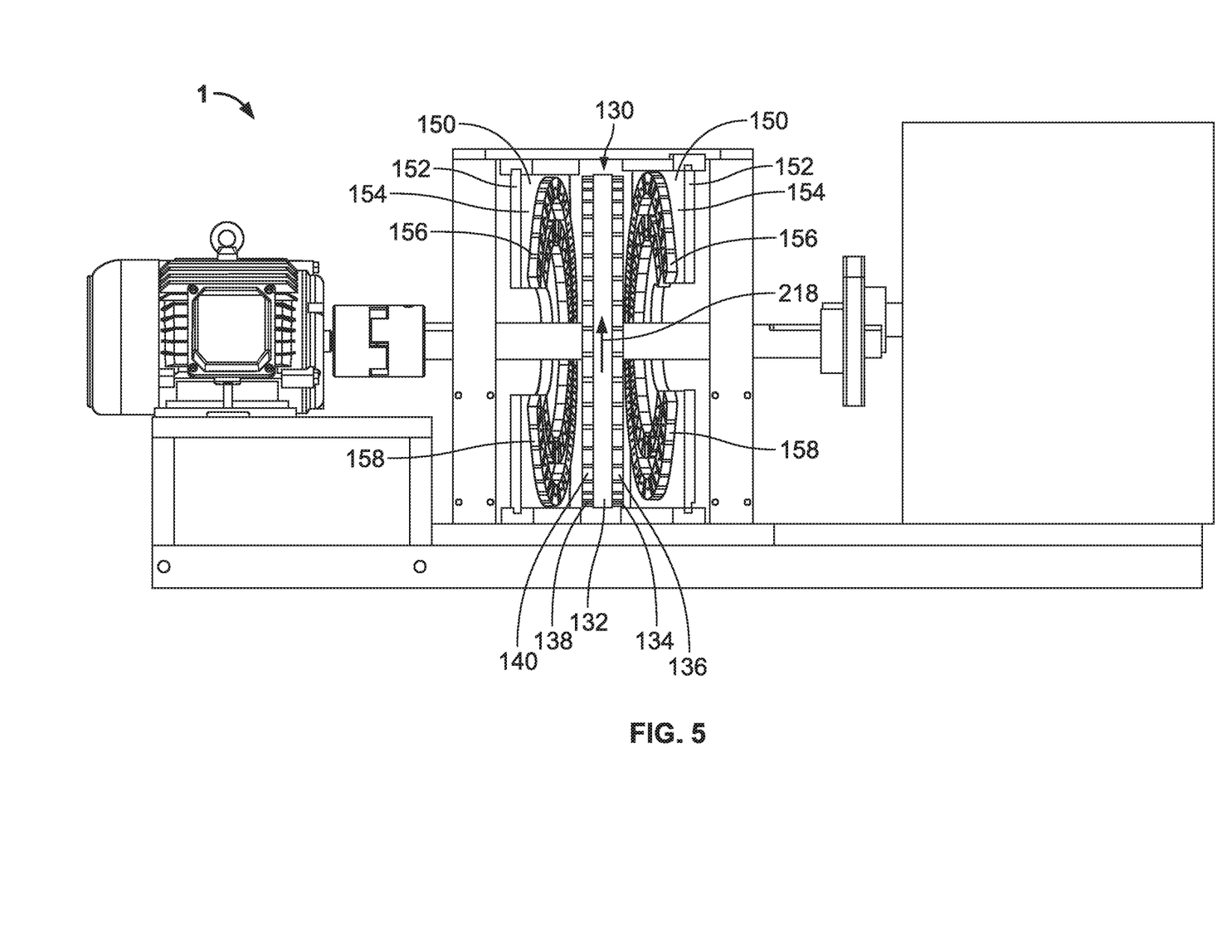
FIG. 5 illustrates a side view of the second embodiment of the torque augmentation device.

Referring to FIG. 5, a side view of the second embodiment of the torque augmentation device is shown.

The torque augmentation device 1 includes the rotating assembly 130 with rotor 132. The rotor 132 includes a first face 134 with first magnet set 136, and second face 138 with second magnet set 140

On either side of the rotor 132 is a static assembly 150 with plate 152. The plate 152, on its inner face 154, has an upper magnet set 156 and lower magnet set 158. In this second embodiment, the upper magnet set 156 is set to attract the magnets on the rotor, and the lower magnet set 158 is set to repel. Thus, the rotor 132 rotates into the top of the figure, and out the bottom, shown as direction of rotation 218.

In other embodiments, the polarity of the upper and lower magnet sets 156/158 are swapped, or one magnet set removed entirely. This latter option is discussed more fully below.

Figure 6:
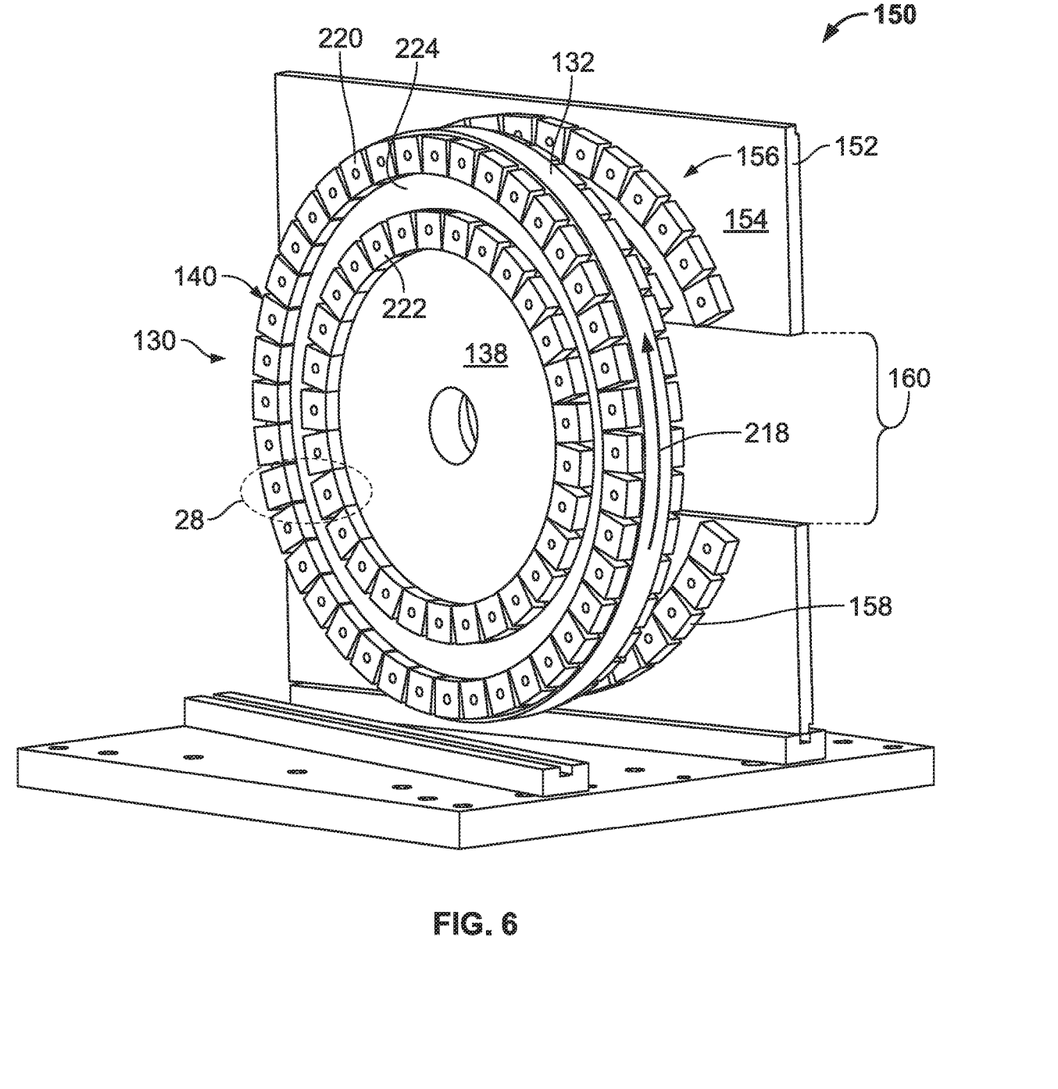
FIG. 6 illustrates a detail view of the rotor of the second embodiment of the torque augmentation device.

Referring to FIG. 6, a detail view of the rotor of the second embodiment of the torque augmentation device is shown.

The rotating assembly 130 includes a rotor 132, with a visible second face 138 and a second magnet set 140.

The second magnet set 140 includes individual magnet groups 28, with each group 28 including an outer magnet 220 and inner magnet 222. While a center magnet 224 may be a discrete magnet, in the figure, the rotor 132 is ferrous, and acts as the center magnet 224.

The static assembly 150 is shown with a plate 152, the inner face 154 visible with upper magnet set 156 and lower magnet set 158.

This embodiment includes a plate gap 160 for easy removal of the plate 152 from around the shaft 114 (see FIG. 3). Given the distance between the rotating assembly 130 and the static assembly 150 at their greatest separation, the lack of magnets across the plate gap 160 has little effect on the operation of the device.

Figure 7:
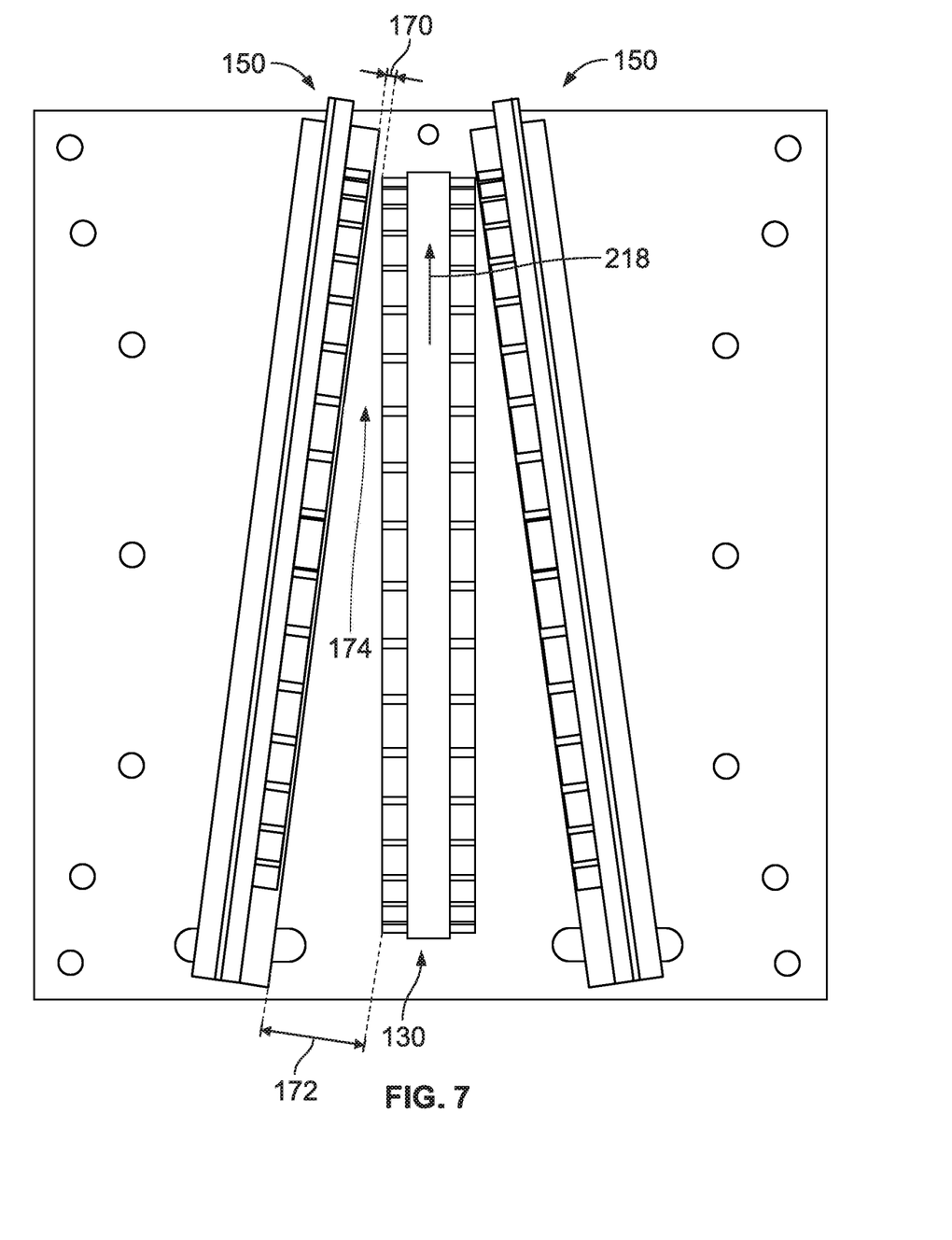
FIG. 7 illustrates a top view of the rotor of the second embodiment of the torque augmentation device.

Referring to FIG. 7, a top view of the rotor of the second embodiment of the torque augmentation device is shown.

The rotating assembly 130 in the center is shown with direction of rotation 218.

On either side is static assembly 150.

The rotor angle with respect to a fixed plate 174 creates a minimum magnetic gap 170 on one end, and a maximum magnetic gap 172 on the opposite end.

Figure 8:
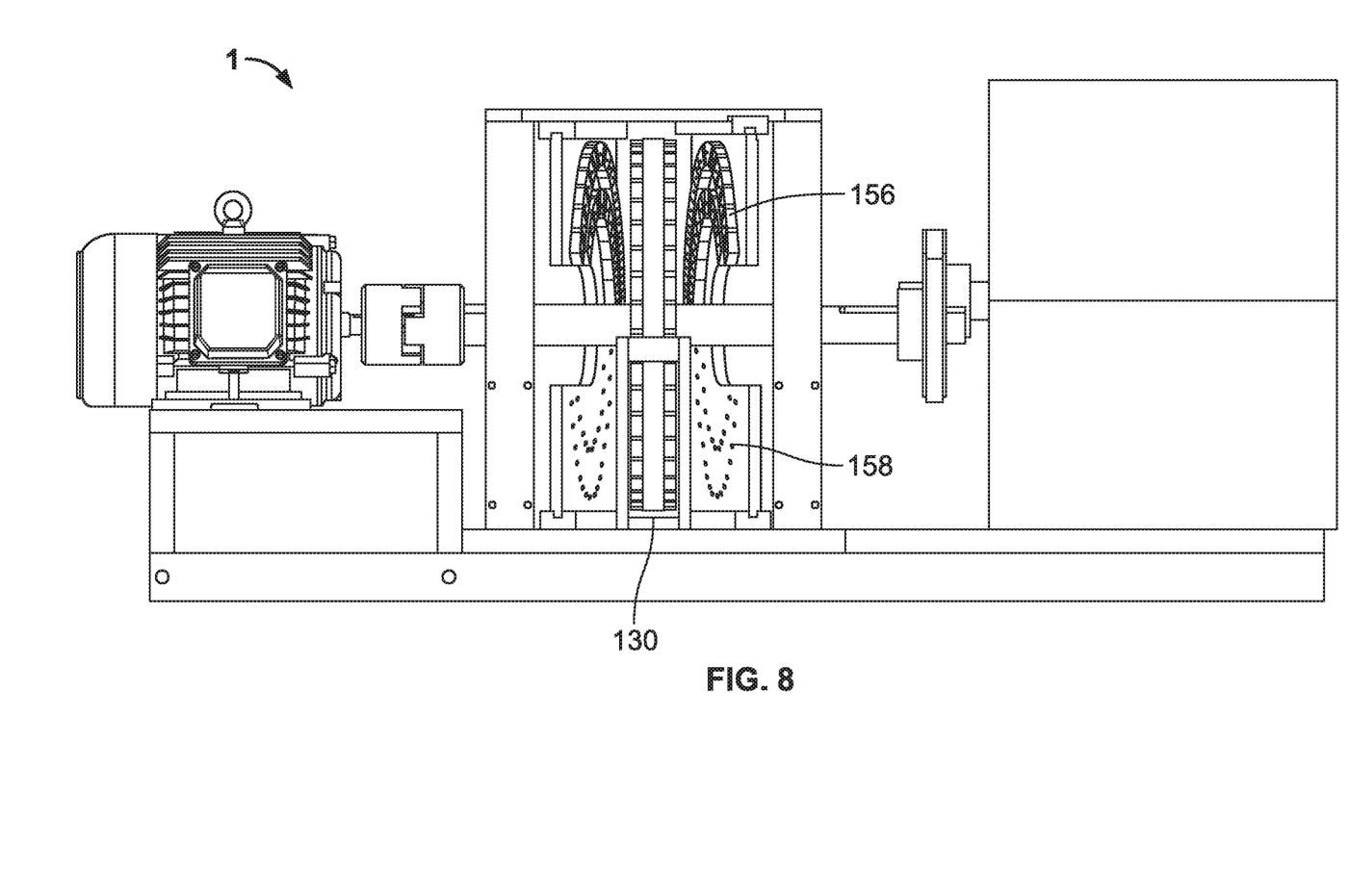
FIG. 8 illustrates a side view of the third embodiment of the torque augmentation device.

Referring to FIG. 8, a side view of the third embodiment of the torque augmentation device is shown.

In this third embodiment of the torque augmentation device 1, the upper magnet set 156 remains as set to attract with respect to the rotating assembly 130, but the lower magnet set 158 is removed. By removing the lower magnet set 158, interaction with the rotating assembly 130 is prevented during the second half of its rotation.

Figure 9:
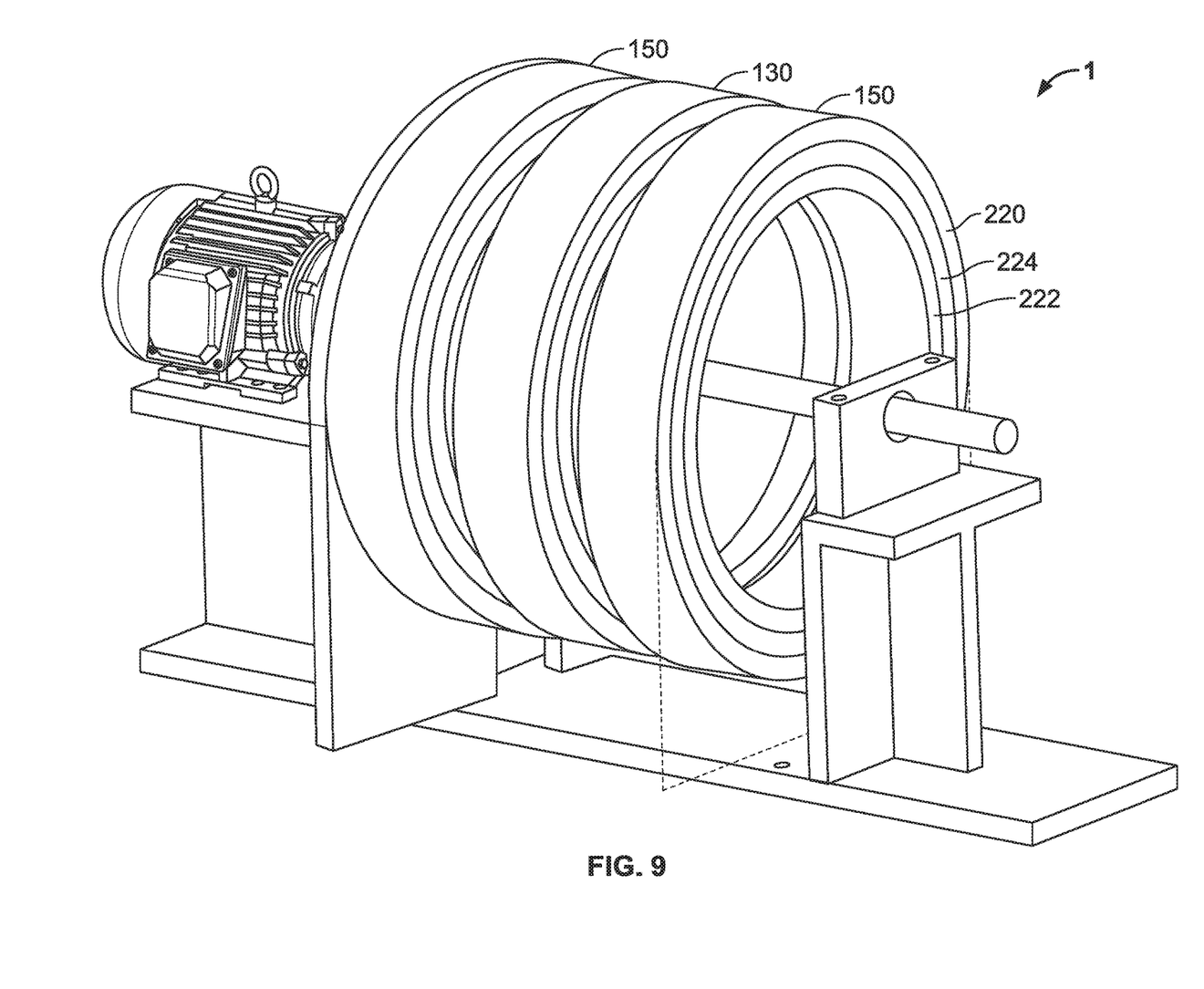
FIG. 9 illustrates an isometric view of the fourth embodiment of the torque augmentation device.

Referring to FIG. 9, an isometric view of the fourth embodiment of the torque augmentation device is shown.

The rotating assembly 130 and static assembly 150 are shown constructed using arc magnets, rather than individual magnets. Thus, outer magnet 220, inner magnet 222, and center magnet 224 are long arc magnets, rather than discrete magnets. The resulting operation may be smoother because of a more even magnetic field.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device to create torque within a rotational system, the device comprising:
a first rotating disc with a first plurality of magnets on a first face;
a second rotating disc with a second plurality of magnets on a second face;
the first face at an angle with respect to the second face;
the angle greater than zero degrees but less than ninety degrees, thereby an orientation of the first rotating disc and the second rotating disc being between parallel and perpendicular;
the angle resulting in uneven interaction between the first plurality of magnets and the second plurality of magnets;
a flux diversion plate between the first rotating disc and the second rotating disc;
the flux diversion plate constructed of a ferrous material;
the flux diversion plate having a tapered shape;
the flux diversion plate having a first surface and a second surface;
the first surface separated from the first plurality of magnets by a first plate gap measured perpendicularly from the first surface;
the first plate gap consistent regardless of position of the first rotating disc;
the second surface separated from the second plurality of magnets by a second plate gap measured perpendicularly from the second surface;
the second plate gap consistent regardless of position of the second rotating disc;
the flux diversion plate blocking only a segment of the first plurality of magnets from interacting with the second plurality of magnets, creating an unbalanced magnetic force;
whereby the unbalanced magnetic force causes the first rotating disc and second rotating disc to rotate, creating torque.

2. The device of claim 1, wherein:
each magnet of the first plurality of magnets is a first, second, and third magnet;
the first magnet oriented with its South pole toward the first rotating disc;
the second magnet oriented with its North pole toward the first rotating disc;
the third magnet between the first magnet and second magnet, the third magnet oriented with its North pole toward the first magnet and its South pole toward the second magnet;
whereby this arrangement of the first, second, and third magnets creates a Halbach array, focusing a magnetic field of the first rotating disc toward the second rotating disc.

3. The device of claim 1, wherein the magnets are permanent magnets.

4. The device of claim 1, wherein the first plurality of magnets is a collection of discrete magnets.

* * * * *